Dec. 28, 1965  G. H. OXLEY ETAL  3,226,217
METHOD AND APPARATUS FOR THE MANUFACTURE OF SHEET GLASS
Filed Aug. 8, 1962  2 Sheets-Sheet 2
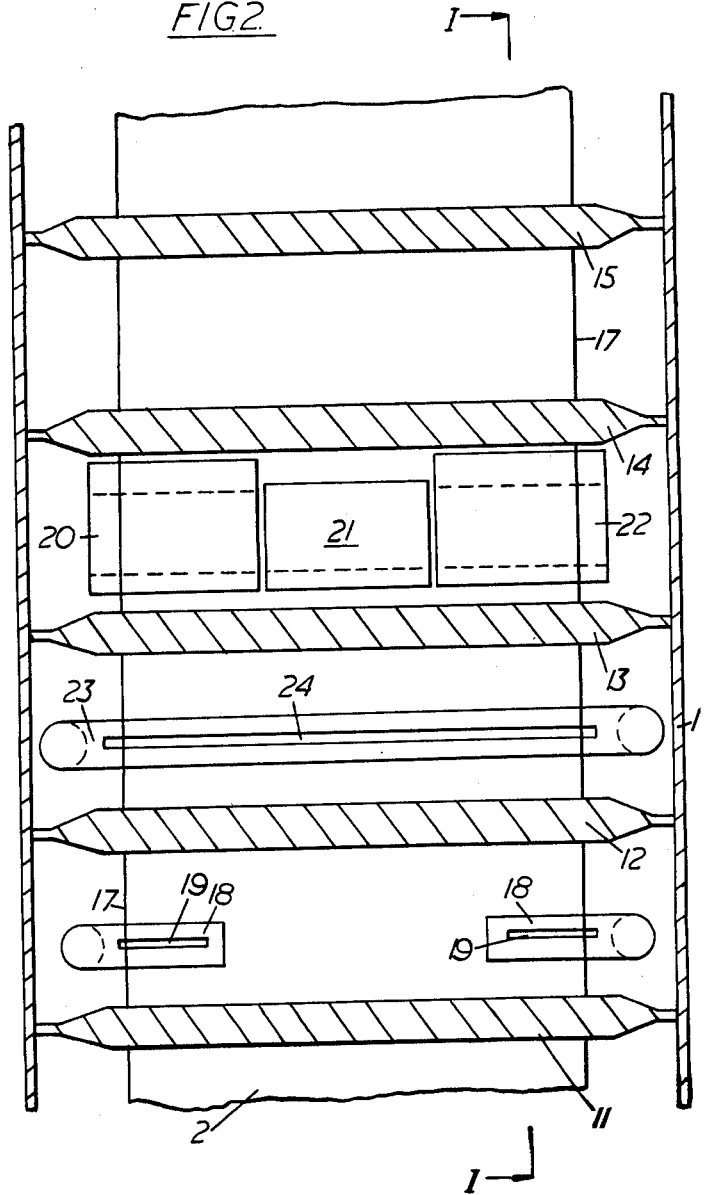
Inventors
GEORGE HUNTLEY OXLEY
EDMUND SYDNEY LITTLER
Attorneys

United States Patent Office 3,226,217
Patented Dec. 28, 1965

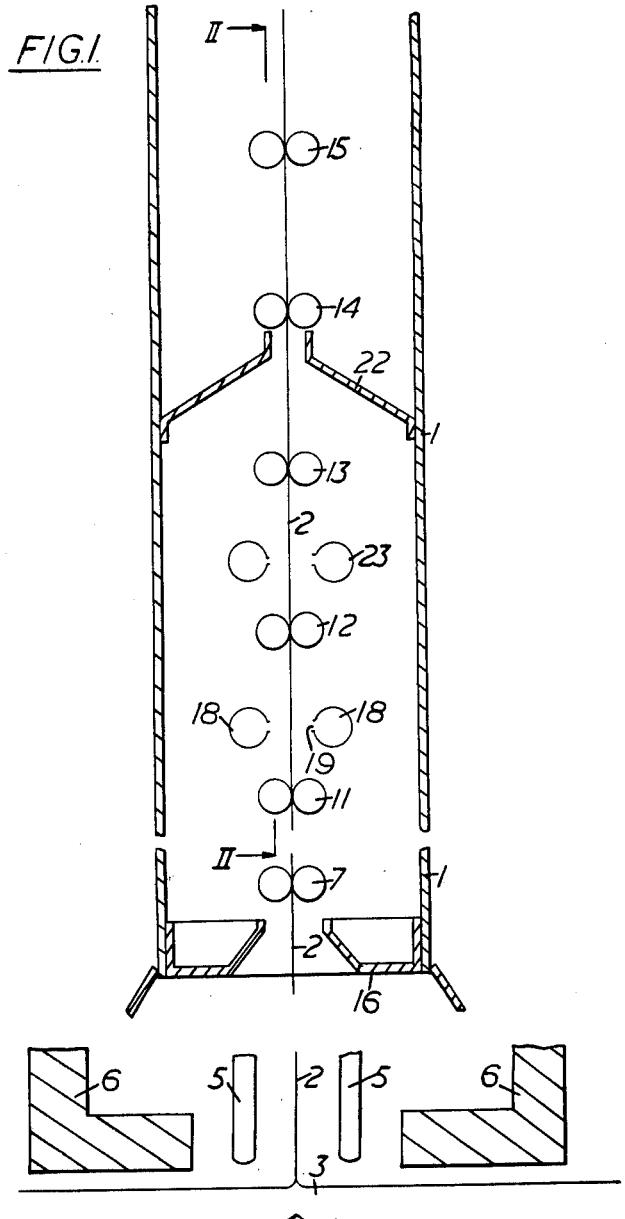

3,226,217
METHOD AND APPARATUS FOR THE MANUFACTURE OF SHEET GLASS
George Huntley Oxley, St. Helens, and Edmund Sydney Littler, Widnes, England, assignors to Pilkington Brothers Limited, Liverpool, England, a company of Great Britain
Filed Aug. 8, 1962, Ser. No. 215,715
Claims priority, application Great Britain, Aug. 18, 1961, 29,961/61
9 Claims. (Cl. 65—95)

This invention relates to the manufacture of sheet glass.

In the manufacture of the sheet glass a continuous ribbon of flat glass is formed and advanced through the annealing lehr where the glass is annealed.

It is well known that, if in the process of annealing the glass excessive or local residual strains are set up, the glass is difficult to cut and accordingly losses will occur when the large sheets cut off at the end of the lehr are being cut to smaller sizes.

Many attempts have been made to control the annealing so as to eliminate this characteristic due to imperfect annealing, but the continuous attempts which have been made to perfect the cooling in the annealing zone of the lehr have not been entirely satisfactory from one point of view or another.

According to the present invention there is provided a process for improving the annealing of flat glass in ribbon form which is advanced through a lehr wherein the glass is annealed, characterised by heating up the marginal portions of the ribbon to a temperature towards the temperature of the corresponding central portion of the ribbon, while the ribbon is passing through the annealing zone in the lehr, and thereby maintaining the marginal portions of the glass ribbon at a temperature above the strain point of the glass until the glass in the central portion cools to near the strain point, and then allowing the glass in both the marginal and central portions to cool below the strain point.

The temperature and the rate of cooling of the central portion of the glass ribbon being advanced through the annealing zone of the lehr may be controlled by concentrating the flow of a gaseous fluid through the lehr over the central portion, so that, in the lower temperature range in the annealing zone, the temperature of the central portion of the glass is brought close to the temperature of the marginal portions of the ribbon, and both the marginal and central portions are cooled through the strain point at substantially the same moment of time.

Desirably the present invention provides a process for improving the annealing of flat glass in ribbon form which is advanced through a lehr wherein the glass is annealed characterised by heating the marginal portions of the ribbon, introducing ancillary gaseous fluid into the annealing lehr, and, at a position in the annealing lehr beyond the position at which the marginal portions of the glass ribbon are heated, constraining the flow of the gaseous fluid to pass over a central portion of the glass ribbon, whereby the marginal portions of the ribbon are maintained at a temperature above the strain point of the glass, as the glass ribbon is advanced through the annealing zone, until the glass in the central portion reaches the strain point.

The present invention further provides a process for improving the annealing of flat glass in ribbon form which is advanced through a lehr wherein the glass is annealed which process is characterised by maintaining the marginal portions of the ribbon, while it is passing through the annealing range, at a temperature above the strain point of the glass by contacting the faces of the said marginal portions with a gaseous fluid at a temperature greater than the temperature of the marginal portion which it contacts but insufficient to raise the temperature of the marginal portion above the highest temperature of the corresponding central portion, maintaining said temperature above the strain point until the glass in the central portion cools to near the strain point and then allowing the glass in both the marginal and central portions to cool below the strain point at a controlled rate of cooling.

Preferably when the gaseous fluid at a temperature greater than the temperature of the marginal portions of the glass ribbon which it contacts is used, this gaseous fluid is applied to the glass ribbon at a position where the marginal temperature of the glass is just above the lower temperature limit of the annealing range. In general the critical annealing zone is at temperatures of the order of 570° C. to 480° C. for present-day sheet glass.

A process according to the invention has application in either a vertical or horizontal annealing lehr. In a horizontal lehr, the flow of the gaseous fluid in the direction of movement of the glass ribbon through the lehr is induced by a fan or other draught-introducing means. In a vertical lehr, on the other hand, there is a natural movement of the gases upwards due to the differences in temperature.

According to a feature of the present invention, there is provided a process for continuously annealing flat glass in ribbon form which is advanced through a lehr wherein the glass is annealed, characterised by causing a gaseous fluid at a temperature greater than the temperature of the marginal portions of the glass ribbon which it contacts to come into heat exchange contact with the margins of the glass ribbon at one position in the annealing zone and thereafter constraining the upward flow of the now cooler gaseous fluid to pass over the central portion of the glass ribbon thereby retarding the cooling of the central portion in the annealing zone with consequential decrease in the generation of residual strains in the glass in the annealing zone.

According to a further feature of the invention there is provided a process for continuously annealing flat glass in ribbon form drawn vertically from a body of molten glass and advanced through a lehr, in which the glass is annealed, characterised in that the temperature gradients of the glass ribbon in the annealing zone are reduced by causing a gaseous fluid at a temperature greater than the temperature of the marginal portions of the ribbon in the annealing zone to strike the faces of the marginal portions, and then constraining the upward flow of the gaseous fluid to pass over a central portion of the face of the glass ribbon, so that the now cooler gaseous fluid rises through the remainder of the annealing zone in the neighbourhood of the said central portion.

Conveniently there is additionally brought into heat exchange contact with the glass ribbon in the annealing zone across the full width of the glass ribbon a gaseous fluid, the temperature of which is greater than the surface temperature of any part of the glass ribbon at the level in the lehr at which the additional gaseous fluid is introduced.

The temperature of the gaseous fluid which is used in either of the stages of the process may conveniently be any temperature between 600° C. and 1200° C. The upper limit on this temperature range is fixed by the requirement that the temperature of the gaseous fluid must not be so great that there is any danger of the marginal portions of the glass ribbon softening as a result of contact with the gaseous fluid or that after heat exchange with the marginal portions the temperature of the gaseous fluid should not be so great that it materially raises the temperature of any part of the central portion of the ribbon. Preferably the temperature of the gaseous fluid which is introduced is of the order of 900° C. to 1100° C.

It is believed that the improved quality of the glass sheet obtained by a process according to the invention is due to a reduction in the temperature gradient across the width of the glass ribbon in the annealing zone as well as in a reduction in the temperature gradient through the thickness of the ribbon. Furthermore the arrangement is such that, so far as possible, both the marginal and central portions of the glass ribbon are cooled through the strain point at substantially the same moment of time.

In a preferred embodiment of the invention in which the gaseous fluid is caused to pass over the central portion of the glass ribbon by constraining an upward flow of the fluid, it is necessary for a vertical lehr to be employed. In this case, the lehr is constructed as a superstructure over the drawing chamber so that the glass drawn vertically from the body of molten glass in the drawing chamber continues to be advanced in the same vertical plane to the dicharge end of the lehr where the emerging ribbon is severed, as is well known in the art, to produce sheets from the ribbon.

Accordingly the present invention also comprehends apparatus including a vertical lehr for annealing sheet glass in ribbon form, the lehr comprising rolls for guiding the glass ribbon through the lehr, blowing means for blowing a gaseous fluid to strike against both surfaces of the two marginal portions of the glass ribbon, and baffles positioned at a level in the lehr above the level of the said blowers, the baffles being arranged so as substantially to prevent the passage of the gaseous fluid vertically upwards in the lehr in contact with the said marginal portions and to allow the vertical passage upwards of the said gaseous fluid in contact with the central portion of the glass ribbon.

Conveniently the baffles are arranged in three sections in the lehr, two sections of the baffles being substantially equal in width to the marginal portions of the glass ribbon and positioned in relation to the said marginal portions and one of the pairs of rolls above the level of the blowing means in the lehr such that the passage of gaseous fluid over the surface of the marginal portions of the glass ribbon to the top of the lehr is substantially prevented, and the third section of the baffles being positiond in relation to the central portion of the glass ribbon such that gaseous fluid may pass upwards through the lehr in heat exchange contact with the said central portion.

In order that the invention may be more clearly understood, reference will now be made to the accompanying drawings which illustrate by way of example one preferred embodiment of the invention and in which:

FIGURE 1 shows a tower lehr superimposed in normal manner over a drawing chamber in which a ribbon of glass is vertically drawn from the body of molten glass in the chamber, the view in FIGURE 1 being a sectional view taken along the lines I—I of FIGURE 2, and FIGURE 2 shows a sectional view of the tower lehr of FIGURE 1 taken along the lines II—II.

In the drawings like reference numerals designate the same or similar parts.

Referring to the drawings and particularly to FIGURE 1, a tower lehr 1 is superimposed in normal manner over the drawing chamber in which a ribbon 2 of glass is drawn vertically from the bath of molten glass 3 in the drawing chamber. The ribbon 2 is drawn from the surface of the bath above a draw bar 4 submerged in known manner in the molten glass to stabilise the line of draw.

The glass ribbon 2 is drawn vertically between the coolers 5 and the L blocks 6 before entering the annealing lehr 1. The annealing lehr 1 includes pairs of drawing rolls of which there are shown in FIGURE 1 rolls 7, 11, 12, 13, 14 and 15. The rolls shown in FIGURE 1 are rsepectivley the 1st, 5th, 6th, 7th, 8th and 9th drawing rolls in the annealing lehr, the 2nd, 3rd and 4th rolls having been omitted for clarity. Catch-pans 16 are provided in the normal way at the foot of the annealing lehr which may also include the usual baffles not shown in FIGURE 1. As the ribbon 2 of glass is drawn from the bath of molten glass 3, the glass cools and when it passes through the first set of drawing rolls 7, the glass ribbon is relatively firm. The glass ribbon naturally cools more quickly over the marginal portions of the ribbon than in the central portion and in addition during the drawing process the thickened edges of the ribbon are preferentially cooled to prevent narrowing or "necking" of the ribbon. In this connection when reference is made to the marginal portion, this is intended to cover the portion from the actual edges 17 of the glass ribbon up to the central third of the glass ribbon 2.

In a vertical drawing process it frequently happens that the marginal portions of the glass ribbon or parts thereof may have cooled to a temperature at the top of the annealing range by the time the ribbon 2 passes between the drawing rolls 7 which are the first pair of drawing rolls in the annealing lehr 1. The central portion of the glass ribbon 2, however, will not have cooled to a temperature at the top of the annealing range until the glass ribbon has passed between for example, the third and fourth drawing rolls which are not shown in either of the figures in the accompanying drawings.

With the particular ribbon of glass under consideration, by the time that the glass ribbon 2 passes between the fifth set of drawing rolls 11, the whole of the glass ribbon 2 will have cooled at least to a temperature within the annealing range. However, the position of the annealing zone in the lehr will depend in individual cases on the thickness of the ribbon being drawn as well as on other conditions in the drawing kiln and in the lehr.

Between the fifth and sixth sets of drawing rolls 11 and 12, there are provided manifolds 18 which have openings 19 through which a gaseous fluid may be passed so that the fluid strikes the faces of the marginal portions of the glass ribbon 2. The exact position of the manifolds 18 will vary according to the thickness of the glass being drawn, the position shown in the drawings being that preferred for glass of 2.85 mm. thickness. However, for glass of some thicknesses it is preferred to provide two pairs of manifolds 18 situated in appropriate positions, for example, for glass of thickness of the order of 4 mm.–5.6 mm., one pair of manifolds is situated below the fifth drawing rolls while the other pair is situated above the fifth drawing rolls.

The gaseous fluid which is introduced through the manifolds 18 is formed by burning ordinary town gas inside the burner chamber, and the combustion products obtained are then introduced into the annealing tower through the openings 19 in the manifolds 18. The temperature of the gaseous fluid which passes through the openings 19 and strikes the faces of the marginal portions of the glass ribbon 2 is of the order of 900° C. to 1100° C.

In FIGURE 2, the openings 19 in the manifolds 18 are shown as slots covering the portion of the ribbon of glass over which it is desired to introduce the hot gas. However other forms of opening may be used, for example there may be a series of perforations in the manifold 18 through which the gas is ejected. It is preferred, however, to use the slot 19 as shown in FIGURE 2 although this may be associated with means for varying the width of the slot so that the quantity and pressure of the gas injected may be varied as desired.

Conveniently the hot gas is caused to strike the marginal portions of the glass ribbon 2 over a width approximately an inch less than the width of the thickened edge which is to be cut off from the glass ribbon obtained at the top of the annealing lehr 1.

Between the seventh and eighth rolls 13 and 14 there are provided three sets of baffles 20, 21 and 22. These baffles 20 to 22 are similar to the baffles normally employed in an annealing lehr but are divided into three sections of approximately equal size, the baffles 21 corresponding with the central third of the glass ribbon 2 and the other baffles 20 and 22 corresponding with the marginal portions of the ribbon and extending approximately a third of the way in from the edges of the ribbon 2.

The baffles 20 and 22 are arranged so that their top edges extend to a distance about a quarter of an inch from the bottom of the drawing rolls 14 while the baffles 21 do not extend close to the drawing rolls 14. The gap between the top edges of the baffles 21 and the bottom of the drawing rolls 14 is about 1¾" or 1½".

By the arrangement of the baffles 20 to 22 such as described, the natural "chimney" effect which usually occurs in a vertical annealing lehr is regulated so that the upward flow of gas occurs almost entirely over the central portion of the glass ribbon 2. The baffles 20 and 22 extend so close to the drawing rolls 14 that the "chimney" over the marginal portions of the glass ribbon is effectively closed, while the baffles 21 are arranged so that the chimney is effectively open.

As the heated gas introduces by the manifold 18 comes into heat exchange contact with the marginal portions of the glass ribbon, it causes the temperature of the marginal portions to be raised. However, by the time that the gas from the manifold 18 is passing over the central portion of the glass ribbon, it will have been cooled by the interchange of heat with the marginal portions of the ribbon and by mixture with the cooler gas normally present and rising through the annealing lehr 1.

In the embodiment of the invention being described, there are additionally provided, between the sixth and seventh drawing rolls 12 and 13, manifolds 23 having therein an opening 24 which extends across the full width of the glass ribbon 2. Again the exact position of the manifolds 23 in the lehr will depend on the exact location of the annealing zone in the lehr, which in turn depends on the thickness of the glass ribbon being drawn as well as on other conditions in the drawing kiln and in the lehr. The manifolds 23 are fed with a hot gaseous fluid obtained in a similar manner to that already described for the manifolds 18 and this gaseous fluid, at a temperature of approximately 1000° C., is allowed to come into contact with the whole of the glass ribbon at any time at the level of the slot 24.

As in the case of the manifold 18, the manifolds 24 can include other forms of openings through which the gas is allowed to come into contact with the glass ribbon 2. In the case of the manifold 23 the slot 24 may however conveniently not be continuous as it is found with a continuous slot that the pressure of the gas introduced has to be very high if any substantial quantity of the hot gas is to be brought into contact with the central portion of the glass ribbon 2. The gas introduced from the manifold 23 together with the gas which is used by the manifold 18 is constrained to pass over the central portion of the glass ribbon 2.

The introduction of the hot gaseous fluid through the manifolds 23 imparts additional heat to the ribbon uniformly across its whole width so that the glass in the ribbon remains for a longer period of time within the upper limits of the annealing range and so helps to minimise the temperature gradient between the centre and the surfaces of the ribbon.

It will be appreciated that the annealing lehr 1 is carefully sealed, at least up to the level of the baffles 20 to 22, in order to prevent the occurrence of casual in-draughts. The lehr 1 is thus sealed against in-draughts up to a position at which the glass ribbon 2 has passed through the annealing zone.

It is found that, when using an arrangement of the manifolds 18 and the baffles 20, 21 and 22, glass sheets obtained from the ribbon may be cut subsequently with a very considerably reduced loss of the glass due to unintended fractures caused by the strains in the glass. With the manifold 23 also included in the annealing lehr a further improvement in the "cutability" of the glass is obtained.

Both these arrangements achieve the improvement in the quality of the glass sheet obtained at least partly as a result of a reduction in the transverse temperature gradient in the glass ribbon. This reduction, or flattening out, of the temperature curve across the width of the glass ribbon, occurs because the heated gas coming into contact with the marginal portions of the glass ribbon raises the temperature of the marginal portions relative to the central portion of the ribbon.

We claim:

1. A process for improving the annealing of flat glass in ribbon form during which the glass is advanced through a lehr wherein the glass is annealed, characterized by directing gaseous fluid at a temperature greater than the temperature of the glass in the annealing zone in a direction transversely of the plane of the glass ribbon and against the faces of each of the marginal portions of the glass ribbon at one position along the annealing zone to impart heat to the said marginal portions, said fluid being sufficient to raise the temperature of said marginal portions nearer to the temperature of the corresponding central portion of the ribbon, and to maintain the marginal portions of the glass ribbon at a temperature above the strain point of the glass until the glass in the central portion cools to near the strain point, and then allowing the glass in both the marginal and central portions to cool below the strain point.

2. A process according to claim 1, wherein the glass is raised vertically up an annealing tower, characterized by constraining the upward flow of the gaseous fluid after the gaseous fluid has been in contact with the marginal portions of the glass ribbon so that now cooler gaseous fluid is caused to pass over both surfaces of a central portion of the glass ribbon in contact with said surfaces at a higher position in the annealing zone, while maintaining said cooler gaseous fluid substantially out of contact with the marginal portions of the ribbon, thereby retarding the cooling of the central portion of the glass ribbon in the annealing zone with consequential decrease in the generation of residual strains in the glass in the annealing zone.

3. A process according to claim 1, wherein the gaseous fluid which is caused to strike the faces of the marginal portions of the glass ribbon to raise the temperature thereof is a gaseous fluid at a temperature in the range of 900° C. to 1100° C.

4. A process according to claim 2, characterized by additionally bringing into heat exchange contact with the glass ribbon in the annealing zone across the full width of the glass ribbon a gaseous fluid the temperature of which is greater than the surface temperature of any part of the glass ribbon at the level in the annealing tower at which the additional gaseous fluid is introduced.

5. A process according to claim 4, wherein the gaseous fluid which is brought into heat exchange contact with the glass ribbon across the full width of the glass ribbon is a gaseous fluid at a temperature in the range of 900° C. to 1100° C.

6. A process according to claim 2, wherein the gaseous fluid which is caused to strike the faces of the marginal portions of the glass ribbon to raise the temperature thereof is a gaseous fluid at a temperature in the range of 900° C. to 1100° C., and additional gaseous fluid is brought into heat exchange contact with the glass ribbon in the annealing zone across the full width of the glass ribbon at a temperature of 900° C. to 1100° C. and at a level in the annealing tower at which the surface temperature of any part of the ribbon is substantially less than 900° C.

7. An apparatus including a vertical lehr for annealing sheet glass in ribbon form, the lehr comprising rolls for guiding the glass ribbon through the lehr, blowing means for blowing gaseous fluid in a direction transversely of the plane of the glass ribbon and directly against both surfaces of the two marginal portions of the glass ribbon, and baffle means positioned at a level in the lehr above the level of said blowing means for preventing the passage of the gaseous fluid vertically upwards in the lehr in contact with the said marginal portions and for confining the vertical passage upwards of said gaseous fluid to contact with the central portion of the glass ribbon.

8. Apparatus according to claim 7 in which the baffle means comprises baffles arranged in three sections in the lehr, two sections of the baffles being substantially equal in width to the marginal portions of the glass ribbon and being so positioned in relation to said marginal portions and one of the pairs of rolls above the level of the blowing means in the lehr that the passage of gaseous fluid over the surfaces of the marginal portions of the glass ribbon to the top of the lehr is substantially prevented, and the third section of the baffles being so positioned in relation to the central portion of the glass ribbon that the gaseous fluid passes upwards through the lehr in heat exchange contact with said central portion.

9. Apparatus according to claim 7, comprising manifold means positioned in the lehr at a level between the blowing means and the baffle means and so arranged that a gaseous fluid emitted by said manifold means is caused to strike the faces of the glass ribbon over substantially their whole width.

References Cited by the Examiner
UNITED STATES PATENTS

| | | | |
|---|---|---|---|
| 1,576,516 | 3/1926 | Koupal | 65—118 |
| 1,726,114 | 8/1929 | Morton | 65—95 |
| 1,988,560 | 1/1935 | Kutchka | 65—194 |
| 2,774,190 | 12/1956 | Atkeson | 65—95 |

DONALL H. SYLVESTER, *Primary Examiner.*